Jan. 25, 1955     A. H. BUCKLEY     2,700,199
DEADEND YOKE
Filed April 1, 1952
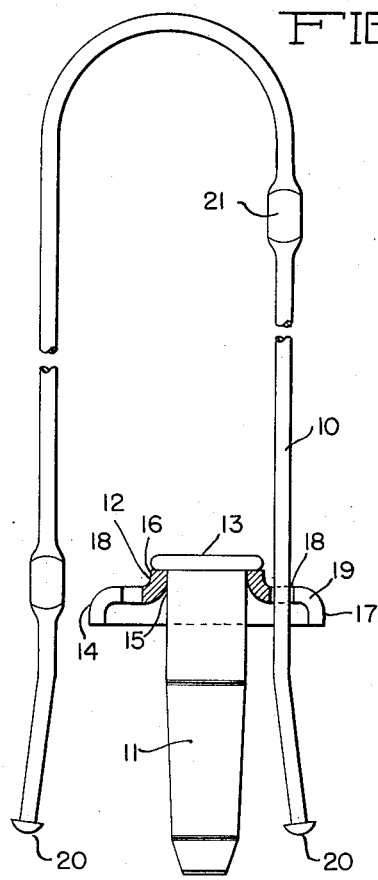
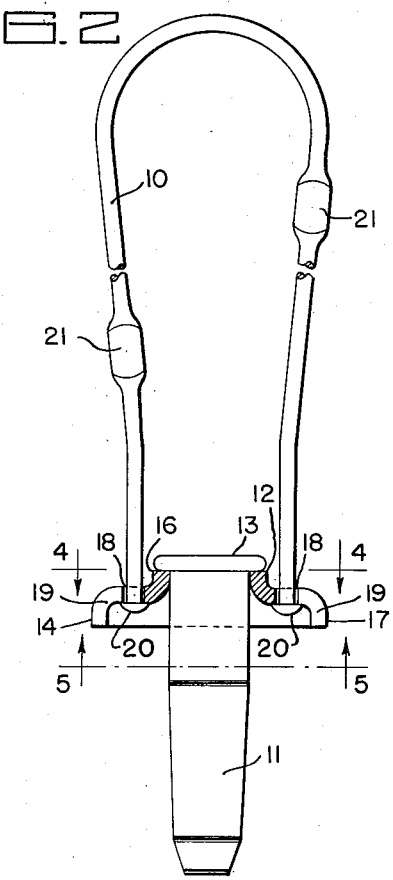
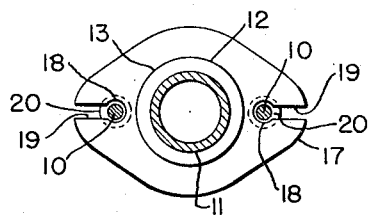
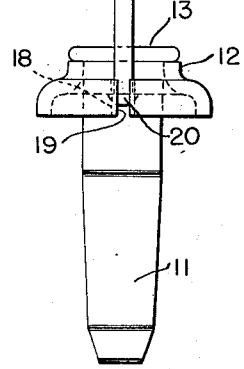
INVENTOR:
ARTHUR H. BUCKLEY
BY:
*Zabel & Gritzbaugh*
ATTORNEYS:

United States Patent Office

2,700,199
Patented Jan. 25, 1955

2,700,199
DEADEND YOKE

Arthur H. Buckley, Chicago, Ill., assignor to Reliable Electric Company, Chicago, Ill., a corporation of Illinois Application April 1, 1952, Serial No. 279,806

2 Claims. (Cl. 24—123)

This invention relates to improvements in wire supporting devices of the type known as deadends, and in particular, to an improved dead end yoke.

The deadend comprises a wire gripping device known as a cartridge, a bail, which comprises a loop of wire by means of which the deadend is supported, and a yoke which connects the bail with the cartridge. The cartridge may be in the form of a metal shell within which are disposed wire gripping jaws; it may be in the form of a compression sleeve, or it may be any other device which firmly grips the wire so that the tension of the line wire may be transmitted by the deadend to a suitable support, such as an insulator.

Due to the heavy strain imposed upon the yoke, the yoke has heretofore been formed from a piece of tubing of comparatively heavy stock, as shown in Jugle 2,288,138.

It is an object of the present invention to provide a yoke which can be stamped from sheet stock, but which is so shaped and designed as to take up and transmit the stresses imposed upon it.

A further object of the invention is to provide a deadend yoke which is so constructed that the bail may readily be disconnected from the yoke, without first disengaging the yoke from the cartridge, while at the same time providing a very positive interlocking action between the bail and the cartridge which will prevent accidental dislodgment of the parts.

Other objects, features and advantages will become apparent as the description proceeds.

With reference now to the drawings in which like reference numerals designate like parts:

Fig. 1 shows a preferred embodiment of the present invention, the bail being shown in its disconnected position, and the yoke being shown in section;

Fig. 2 is a view similar to Fig. 1, but showing the parts in their operative position, in fully assembled position;

Fig. 3 is a side view of Fig. 2;

Fig. 4 is a top view of the yoke taken along line 4—4 of Fig. 2; and

Fig. 5 is a bottom view of the yoke, taken along line 5—5 of Fig. 2.

As shown in the drawings, the deadend comprises a bail 10, a wire gripping device or cartridge 11 and a yoke 12 which connects the two. The cartridge is formed with a flange 13 at its upper end, the terms "upper" and "lower," and related expressions, being used herein in a relative sense only. As indicated previously, the cartridge may be of the spring-biased jaw type, as shown herein, or it may be of the compression sleeve type, also provided with a flange corresponding to flange 13, or it may be of some other suitable type which serves to transmit the tension from the wire to the yoke, the exact type of cartridge not being critical to the invention.

The yoke 12 comprises what could be referred to as a web portion 14 which is provided with a centrally disposed aperture 15 of a size which will receive the cartridge. In forming the aperture, the web portion is deformed or turned upwardly so as to provide an upturned edge 16. This upturned edge is engaged by the flange 13; the upturning increases the strength of the yoke at this point, which is the point subjected to the greatest stress. This is for the reason that the upturning causes the force to be transmitted through a greater thickness of metal, and in a direction which generally parallels the grain of the metal. Also, the working of this upturned portion incident to its formation increases its stress transmitting properties.

The yoke is formed with an external downwardly turned flange 17 which also serves to enhance the rigidity of the yoke and to improve the distribution of stress within the web portion. The flange also serves an additional purpose as will be pointed out hereinafter.

The web portion is also provided with apertures 18 which are adapted to receive the ends of the bail 10, these apertures therefore being of a comparatively small diameter. The apertures 18 are formed in the horizontally disposed web portion 14 and are located as closely as possible to the upturned edge 16 so as to minimize the amount of bending stress in the metal disposed between the apertures 18 and the aperture 15, this metal being referred to generally as the upturned edge 16.

Slots 19 extend through the flange 17 and into the web 14 and communicate with the apertures 18. These slots are of a width which is less than the diameter of the apertures 18.

The bail 10 is preferably of the "hard wire" type, which means that it is formed from a single strand of wire or bar stock, preferably from stainless steel wire stock. The ends of the bail are headed over as indicated by reference numeral 20 so that they will engage the undersurface of the yoke 12. However, any other suitable type of enlargement may be provided so as to insure the proper interlocking action. It will be observed that when the parts are disposed in their interlocked position, as shown in Fig. 2, that the flange 17 prevents outward movement of the bail through the slot 15. However, the interlocking of the headed ends 20 and the flange 17 is only one of two separate interlocking actions provided by the present invention, and, as pointed out hereinafter it is of secondary importance to the main interlocking action.

The main interlocking action is best shown in Fig. 4, wherein it will be observed that the width of the slots 19 is less than the diameter of the bail wire 10. Thus, the end portions of the bail wire cannot be displaced outwardly through the slots, but remain locked in the apertures 18. To permit assembly and disassembly the bail is provided with a flattened portion 21 which is located an inch or two upwardly from a headed over end 20. The flattened portions 21 is narrower than the slot 20 to permit assembly. The width of the flat is equal to or less than the diameter of the aperture 18; in the alternative, the flat 21 merges with the round part of the wire in such a manner that the parts may be easily assembled. Thus, in order to insert an end of the bail into the aperture, the yoke and cartridge must be moved upwardly with respect to the bail until the flattened portion 21 is opposite a slot 19, and the same applies to disconnecting one end of the bail from the yoke. A second flat 21 may be provided on the other leg of the bail to facilitate initial assembly of the deadend. However, this can be even further removed from its end of the yoke leg since in normal use, on the job, only one leg of the bail needs to be connected and disconnected. As a matter of fact, it would be disadvantageous to have the two flattened portions opposite from each other since as soon as the yoke were moved up to disengaged position, there would be a tendency for both legs of the bail to become disconnected.

To summarize the operation, the yoke is assembled with one leg of the bail prior to installation, and the cartridge is also inserted in the yoke at this time. Then, in installing the device, the line wire is inserted into the cartridge; then the free end or leg of the bail is threaded through the insulator or other supporting device. The parts are then brought into the Fig. 1 position which permits the free leg of the bail to be slipped through the slot 19 into the aperture 18. The parts are then released and the tension on the wire causes them to assume the Fig. 2 position. In normal line work there will never be enough slack or whipping of the line as to cause unintended displacement of the cartridge and yoke from the Fig. 2 position into the Fig. 1 position, with the result that the parts are securely interlocked, and there can be no failure. If preferred, the flattened portion 20 could be disposed at an angle to the orientation of its slot 19, thereby requiring a twisting of the bail leg prior to insertion. However, this feature is not necessary to the normal installation.

Similarly, to disconnect the deadend from the insulator or other supporting device, the cartridge and yoke are grasped and displaced upwardly from the Fig. 2 position into the Fig. 1 position; then one leg can be disconnected from the yoke so as to permit the bail to be disconnected from the insulator.

Of course, this construction can be used either with a straight through deadend, in which the free end of the line wire extends through and beyond the cartridge, or in an installation in which the free end of the wire is disposed within the cartridge.

The flange 17 also reinforces the yoke so as to prevent any tendency of the slot to spread. However, in the particular form shown herein, the curved undersurface of the yoke at the flange 17 serves to maintain the headed portion 20 in the position shown in Fig. 2; consequently, the end portion of the bail wire is maintained in centered relationship with respect to the aperture 18 with the result that there is very little, if any, force exerted by the bail in a lateral direction which would tend to spread the slot.

By arranging the slots 19 so that they extend from the apertures 18 outwardly to the periphery, rather than from the apertures 18 inwardly to the central aperture 15, the upturned edge 16 is continuous and uninterrupted. Thus, there is no tendency of the aperture 15 to become enlarged, as by spreading, with the result that the yoke can be fabricated from relatively thin gauge sheet metal stock.

For instance, the yoke may be formed from stainless steel, heat treated aluminum, or bronze. In the alternative, it could be formed from other material such as a suitable laminated plastic depending upon the stresses involved.

Although only a preferred embodiment of this invention has been shown and described herein, it will be apparent that various modifications and changes may be made in the construction without departing from the spirit of the invention as pointed out in the appended claims.

I claim:
1. A yoke for a deadend of the type which includes a bail and a wire gripping member, comprising an integral member of sheet stock having a web portion, a centrally disposed portion deformed upwardly in a direction away from the plane of said web portion to provide a continuous upturned edge defining an aperture for the reception of said wire gripping member, and openings formed in said web portion, at least one of said openings comprising a slot extending from the periphery of said yoke inwardly into said web portion and having a portion of restricted width.

2. A yoke for a deadend of the type including a bail and a wire gripping member, comprising an integral member of sheet stock having a web portion, a centrally disposed portion deformed upwardly in a direction away from the plane of said web portion to provide a continuous upturned edge defining an aperture for the reception of said wire gripping member, a peripheral portion deformed downwardly in a direction away from the plane of said web portion to provide a downturned flange, and oppositely disposed slots extending through said downturned flange inwardly into said web portion.

References Cited in the file of this patent

UNITED STATES PATENTS

| | | |
|---|---|---|
| 76,706 | Brevoort | Apr. 14, 1868 |
| 1,380,800 | Haworth | June 7, 1921 |
| 1,408,212 | Leinbach | Feb. 28, 1922 |
| 1,735,561 | Austin | Nov. 12, 1929 |
| 2,180,977 | Cook | Nov. 21, 1939 |
| 2,255,961 | Becker | Sept. 16, 1941 |
| 2,444,842 | McConahey et al. | July 6, 1948 |
| 2,461,031 | Brickman | Feb. 8, 1949 |
| 2,574,579 | McCoy | Nov. 13, 1951 |

FOREIGN PATENTS

| | | |
|---|---|---|
| 855 | Great Britain | Jan. 21, 1885 |
| 369,962 | Germany | Feb. 24, 1923 |
| 491,031 | Great Britain | Aug. 25, 1938 |